UNITED STATES PATENT OFFICE.

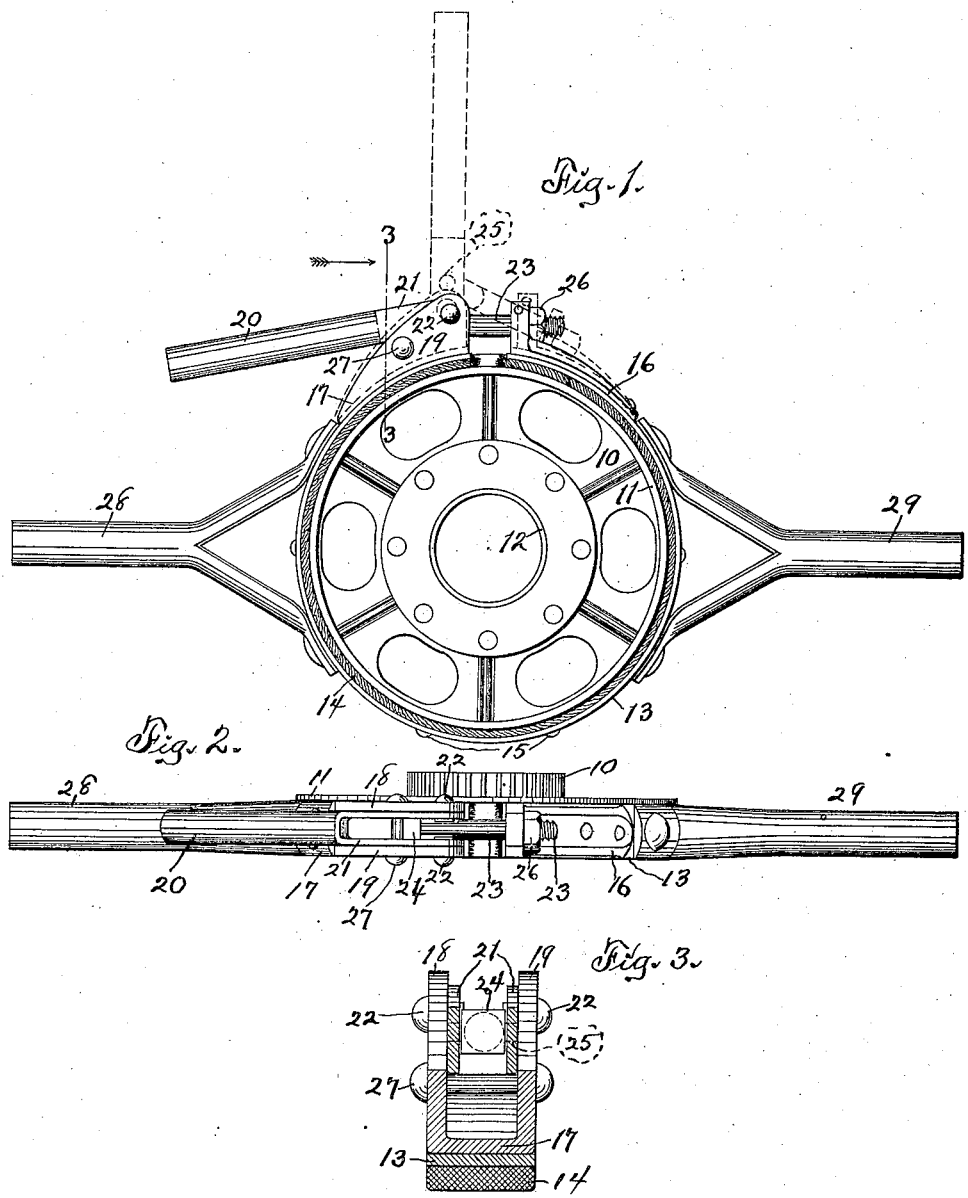

GEORGE D. LAWSON, OF POCAHONTAS, IOWA.

TRANSMISSION-DRUM CLAMP.

1,359,815.   Specification of Letters Patent.   Patented Nov. 23, 1920.

Application filed January 31, 1920. Serial No. 355,481.

*To all whom it may concern:*

Be it known that I, GEORGE D. LAWSON, a citizen of the United States of America, and resident of Pocahontas, Pocahontas county, Iowa, have invented a new and useful Transmission-Drum Clamp, of which the following is a specification.

The object of this invention is to provide means for holding and spinning an object to be reamed relative to a reaming tool.

A further object of this invention is to provide a clamp or wrench adapted to be engaged with and support an object to be reamed, which tool may be readily and conveniently attached to and detached from said object.

A further object of this invention is to provide improved means for expanding and contracting an annular clamp or wrench.

My invention consists in the construction, arrangement and combination of elements hereinafter set forth, pointed out in the claims and illustrated by the accompanying drawing in which—

Figure 1 is a face view showing my device in position for practical use, dotted lines indicating expanded or open position of the clamp relative to the object.

Fig. 2 is an edge view of the same. Fig. 3 is a cross section on the indicated line 3—3 of Fig. 1.

Many machine elements are made with bushings which are subject to wear and abrasion requiring renewal; and it is a common practice to drive out the old bushings and replace them with new bushings reamed out to fit the journal on which the elements operate. Different plans are employed for reaming the new bushings and one such plan used greatly in automobile repair shops in respect of transmission drums for Ford cars, is to lock a reaming tool in a vise and then rotate the drum by hand on the reaming tool until the bushing has been sufficiently treated to fit its shaft. This plan has objections owing to the shape of the drum injuring the hand of the operator and the inability of the operator to maintain the drum in its proper relation to the reamer. To avoid these objections I have produced a device or tool arranged to be clamped on the rim of the transmission drum or other object and provided with handles of convenient form and conveniently located, by the use of which an operator may manipulate said object relative to a reamer with satisfactory results. The same tool when made in different sizes may be employed in handling a great variety of objects such as a transmission triple gear assembly of a Ford car.

In the construction of the device as shown the numeral 10 designates the object, in this instance the reverse drum of a transmission of a Ford car, which object is formed with an annular rim 11 and a bored hub containing a bushing 12 adapted to be reamed. The tool, involving my invention is mounted on and clamped to the rim 11. In the construction of the tool the numeral 13 designates a band or strap, relatively thin and of a width substantially the same as that of the rim 11. The band or strap 13 is bent into substantially circular form and its ends are slightly spaced apart. A lining 14 of friction material such as treated fabric or asbestos, is mounted on the inner face of the band or strap 13 and is secured thereto in any suitable manner such as by rivets 15 at intervals throughout its length. The ends of the lining 14 also are spaced apart slightly. An angular lug 16 is mounted on the outer face of one end portion of the band or strap 13 and the outwardly extending portion of said lug is formed with a hole through which a clamping bolt may pass. A lug 17 is mounted rigidly on the outer face of the opposite end portion of the band or strap 13 and is formed with outstanding parallel flanges 18, 19, which flanges are formed with two pairs of transverse holes, said holes registering in each pair. A handle 20 is formed with a fork 21 and said fork extends within the space between the flanges 18, 19 and is pivoted at its extremity on rivets 22 mounted in one pair of registering holes in said flanges. A clamping bolt 23 is formed with a prismatic head 24 lying between the arms of the fork 21 and said head is pivoted to said fork by a rivet 25 shown by dotted lines in Fig. 3; and said bolt is flattened slightly adjacent its head in order that it may pass freely the inner ends of the rivets 22. The bolt 23 extends across the space between the lugs 16, 17, which space coincides with the space between ends of the band and lining, and also extends freely through the hole in the outstanding portion of the lug 16, and the outer end portion of said bolt is threaded to receive an adjusting nut 26. The handle 20 is adapted to be oscillated on the rivets 22 and the axis of articulation between the head 24 and fork 21 is spaced radially from the axis of articulation between said fork and its support on the flanges 18, 19. Thus, in the movement of the handle 20 around the axis common to the rivets 22, the head 24 of the bolt is carried through an arc and the bolt and nut 26 thereof are moved thereby longitudinally, thus applying or releasing strain which results in approaching or separating the lugs 16, 17 relative to each other to the end of clamping or releasing the lining band or strap 13 relative to the rim 11 of the object. The handle may be moved through clamping position into contact with a rivet 27 mounted on the outer part of holes in the flanges 18, 19 as shown. In such position the handle and bolt 23 are carried beyond the dead center so that the line of draft or strain falls between the rivets 22 and 27 and the rivet 27 serves as a stop for the handle, thus holding the parts in locked position. Forked handles 28, 29 are arranged diametrically opposite each other on and are fixed to the band or strap 13. The handles preferably are arranged in alinement and in such relation to the band that a line through the centers of said handles would lie at right angles to the diameter of the device intersecting the space between ends of the band. Thus the handles 28, 29 are held in convenient position for the manipulation of the entire tool and for the occasional and repeated manipulation of the handle 20. The open position of the handle and connected parts, together with slightly expanded relation of the lugs 16, 17 and end portions of the band 13, are shown in dotted lines in Fig. 1. When the tool is locked in position on the object as shown, said object may be moved and handled by means of the tool in any desired manner and may be mounted and spun on a fixed reamer (not shown) extending through the bushing 12 to the end of reaming said bushing rapidly, conveniently and in a workmanlike manner. When the clamp is released, as indicated by dotted lines in Fig. 1, the tool may be removed or applied to the object conveniently and rapidly and the relative arrangement of the handles 20, 28 and 29 lends itself to a facile adjustment of the clamping elements.

I claim as my invention—

1. A clamping tool, comprising a band of substantially annular form having spaced ends, handles on said band, a lining in said band adapted to engage fixedly the object embraced by said band, a lug mounted rigidly on one end of said band and formed with a hole, a flanged lug on the other end of said band, a forked handle fulcrumed in said flanged lug, a bolt pivoted in the fork of the handle and extending loosely through the hole in the first lug, and a nut on said bolt adapted to engage the outer face of the first lug whereby the band may be adjusted to fit various objects or the same object variously worn.

2. A clamping tool, comprising an integral one-piece band of substantially annular form having spaced ends, handles on said band, a lining in said band adapted to engage fixedly the object embraced by said band, a lug on one end of said band formed with a hole, a flanged lug on the other end of said band, a forked handle fulcrumed in said flanged lug, a bolt formed with a prismatic head pivoted in the fork of the handle and extending loosely through the hole in the first lug, a rivet crossing the outer portion of said flanged lug for limiting oscillation of said handle beyond the dead center, and a nut on said bolt adapted to engage loosely the first lug whereby the band may be adjusted to fit various objects or the same object variously worn, and whereby said tool and the object may be manually rotated.

Signed at Pocahontas, in the county of Pocahontas and State of Iowa, this 23d day of January, 1920.

GEORGE D. LAWSON.